United States Patent
Seo

(10) Patent No.: US 12,335,185 B2
(45) Date of Patent: Jun. 17, 2025

(54) METHOD AND APPARATUS FOR TRANSMITTING AND RECEIVING SIGNAL USING ORTHOGONAL SEQUENCE IN COMMUNICATION SYSTEM

(71) Applicant: ELECTRONICS AND TELECOMMUNICATIONS RESEARCH INSTITUTE, Daejeon (KR)

(72) Inventor: Seok Seo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 390 days.

(21) Appl. No.: 16/952,531

(22) Filed: Nov. 19, 2020

(65) Prior Publication Data

US 2021/0160021 A1    May 27, 2021

(30) Foreign Application Priority Data

Nov. 27, 2019  (KR) .......... 10-2019-0154895
Nov. 3, 2020   (KR) .......... 10-2020-0145196

(51) Int. Cl.
  *H04L 5/00*   (2006.01)
  *H04L 1/1607* (2023.01)

(52) U.S. Cl.
  CPC ............ *H04L 5/005* (2013.01); *H04L 1/1614* (2013.01); *H04L 5/0007* (2013.01)

(58) Field of Classification Search
  CPC ...... H04L 5/005; H04L 1/1614; H04L 5/0007
  See application file for complete search history.

(56) References Cited

U.S. PATENT DOCUMENTS

2005/0195734 A1   9/2005  Sandell et al.
2009/0268685 A1*  10/2009 Chen .............. H04L 5/0053
                                          370/329

(Continued)

FOREIGN PATENT DOCUMENTS

KR   20150007594 A *  1/2015  .......... H04B 7/26
WO   2013025279 A1    2/2013

OTHER PUBLICATIONS

3GPP TS 36.211 V11.2.0 (Feb. 2013) Technical Specification 3rd Generation Partnership Project; Technical Specification Group Radio Access Network; Evolved Universal Terrestrial Radio Access (E-UTRA); Physical Channels and Modulation (Release 11) (Year: 2013).*

*Primary Examiner* — Joseph A Bednash
(74) *Attorney, Agent, or Firm* — LRK PATENT LAW FIRM

(57) ABSTRACT

An operation method of a first communication node in a communication system includes setting a first parameter for multiplexing a plurality of information bits; setting a length of an orthogonal sequence corresponding to each of the plurality of information bits; setting a second parameter representing phase information corresponding to each of the plurality of information bits; generating orthogonal sequences of the plurality of information bits based on the first parameter, the second parameter, and the length of the orthogonal sequence; and transmitting the orthogonal sequences to a second communication node using radio resources.

12 Claims, 5 Drawing Sheets

(56) References Cited

U.S. PATENT DOCUMENTS

| | | | |
|---|---|---|---|
| 2010/0202559 A1* | 8/2010 | Luo | H04B 7/0678 |
| | | | 375/295 |
| 2010/0303164 A1 | 12/2010 | Huang et al. | |
| 2011/0286423 A1 | 11/2011 | Berggren et al. | |
| 2013/0070698 A1 | 3/2013 | Kim et al. | |
| 2018/0338302 A1 | 11/2018 | Han et al. | |
| 2019/0159190 A1 | 5/2019 | Ko et al. | |
| 2019/0200378 A1 | 6/2019 | Ko et al. | |
| 2019/0207730 A1 | 7/2019 | Park et al. | |
| 2020/0045691 A1 | 2/2020 | Park et al. | |

\* cited by examiner

METHOD AND APPARATUS FOR TRANSMITTING AND RECEIVING SIGNAL USING ORTHOGONAL SEQUENCE IN COMMUNICATION SYSTEM

CROSS-REFERENCE TO RELATED APPLICATIONS

This application claims priority to Korean Patent Applications No. 10-2019-0154895 filed on Nov. 27, 2019 and No. 10-2020-0145196 filed on Nov. 3, 2020 with the Korean Intellectual Property Office (KIPO), the entire contents of which are hereby incorporated by reference.

BACKGROUND

1. Technical Field

The present disclosure relates to a technique for transmitting and receiving signals in a communication system, and more specifically, to a technique for transmitting and receiving signals using orthogonal sequences.

2. Description of Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The 5G communication system can support enhanced mobile broadband (eMBB), ultra-reliable low-latency communication (URLLC), massive machine type communication (mMTC), and the like.

In a communication system, a signal (e.g., information or data) may be transmitted using an orthogonal sequence. Here, the length of the orthogonal sequence may be the same as the length corresponding to the number of allocated frequency resources (e.g., subcarriers, resource elements (REs)). In this case, reception performance may be degraded due to a frequency selective fading and/or a time synchronization error.

SUMMARY

Accordingly, exemplary embodiments of the present disclosure are directed to providing methods and apparatuses for transmitting and receiving signals using orthogonal sequences having a specific length in a communication system.

According to a first exemplary embodiment of the present disclosure, an operation method of a first communication node in a communication system may comprise: setting a first parameter for multiplexing a plurality of information bits; setting a length of an orthogonal sequence corresponding to each of the plurality of information bits; setting a second parameter representing phase information corresponding to each of the plurality of information bits; generating orthogonal sequences of the plurality of information bits based on the first parameter, the second parameter, and the length of the orthogonal sequence; and transmitting the orthogonal sequences to a second communication node using radio resources.

Each of the orthogonal sequences may be generated based on $s_i(n_i) = e^{j\alpha_i n_i}$, $n_i = 0, 1, \ldots, M_i-1$, $s_i(n_i)$ may be an orthogonal sequence of an i-th information bit among the plurality of information bits, $\alpha_i$ may be determined based on the first parameter, the second parameter, and the length of the orthogonal sequence for the i-th information bit, and $M_i$ may be the length of the orthogonal sequence of the i-th information bit.

When a value of the i-th information bit is 0, a value of the second parameter may be 0, and when the value of the i-th information bit is 1, the value of the second parameter may be $M_i/2$.

$\alpha_i$ may be generated based on $$\alpha_i = \frac{2\pi\{(p_{o,i} + p_{d,i}) \bmod M_i\}}{M_i},$$

$p_{o,i}$ may be the first parameter, and $p_{d,i}$ may be the second parameter.

A sum of the lengths of the orthogonal sequences may be a length corresponding to a number of frequency resources constituting the radio resources.

The lengths of the orthogonal sequences may be set equally.

At least one of the first parameter, the second parameter, and information indicating the length of the orthogonal sequence may be signaled to the second communication node.

The plurality of information bits may be m information bits in which one information bit is repeated m times.

The transmitting of the orthogonal sequences to the second communication node may comprise: mapping a first orthogonal sequence of a first information bit among the plurality of information bits from a lowest frequency resource; sequentially mapping remaining orthogonal sequences excluding the first orthogonal sequence among the orthogonal sequences to remaining frequency resources; and transmitting the mapped orthogonal sequences.

According to a second exemplary embodiment of the present disclosure, an operation method of a second communication node in a communication system may comprise: performing a monitoring operation to obtain orthogonal sequences generated based on a plurality of information bits from a first communication node; obtaining reception sequences for the orthogonal sequences by the monitoring operation; generating complex conjugates for the orthogonal sequences based on parameters used for generation of the orthogonal sequences; and detecting a value of each of the plurality of information bits corresponding to a specific value calculated based on the reception sequences and the complex conjugates.

The reception sequences may be $r(n)$, $n = 0, 1, \ldots N_a$, and $N_a$ may be a number of frequency resources through which the orthogonal sequences are received.

The parameters may include a first parameter for multiplexing the plurality of information bits, a second parameter indicating phase information corresponding to each of the plurality of information bits, and a third parameter indicating a length of each of the orthogonal sequences.

Each of the orthogonal sequences may be generated based on $s_i(n_i)=e^{j\alpha_i n_i}$, $n_i=0, 1, \ldots, M_i-1$, $s_i(n_i)$ may be an orthogonal sequence of an i-th information bit among the plurality of information bits, $\alpha_i$ may be determined based on the first parameter, the second parameter, and $M_i$, $M_i$ may be the third parameter indicating the length of the orthogonal sequence of the i-th information bit, and the complex conjugates for the orthogonal sequences may be $s^*_{i,b}(n)$.

The specific value max $C_{i,b}$ may be calculated based on max $C_{i,b}=X_1+X_2$, $X_1$ and $X_2$ may be calculated based on ($X_1=|\sum_{i=0}^{m-1}\sum_{n=0}^{M_i-1}r(n')s^*_{i,b}(n)|^2$ or $X_1=|\sum_{i=0}^{m-1}\sum_{n=0}^{M_i-1}r(n')s^*_{i,b}(n)|$) and $X_2=\sum_{i=0}^{m-1}|\sum_{n=0}^{M_i-1}r(n')s^*_{i,b}(n)|^2$ or $X_2=\sum_{i=0}^{m-1}|\sum_{n=0}^{M_i-1}r(n')s^*_{i,b}(n)|$), respectively, m may be a number of the plurality of information bits, $M_i$ may be a length of an orthogonal sequence of an i-th information bit among the plurality of information bits, r(n') may be the reception sequences, and $s^*_{i,b}(n)$ may be the complex conjugates for the orthogonal sequences.

The plurality of information bits may be m information bits in which one information bit is repeated m times.

According to a third exemplary embodiment of the present disclosure, a first communication node may comprise a processor, a memory electronically communicating with the processor, and instructions stored in the memory, wherein when executed by the processor, the instructions may cause the first communication node to: set a first parameter for multiplexing a plurality of information bits; set a length of an orthogonal sequence corresponding to each of the plurality of information bits; set a second parameter representing phase information corresponding to each of the plurality of information bits; generate orthogonal sequences of the plurality of information bits based on the first parameter, the second parameter, and the length of the orthogonal sequence; and transmit the orthogonal sequences to a second communication node using radio resources.

Each of the orthogonal sequences may be generated based on $s_i(n_i)=e^{j\alpha_i n_i}$, $n_i=0, 1, \ldots, M_i-1$, $s_i(n_i)$ may be an orthogonal sequence of an i-th information bit among the plurality of information bits, $\alpha_i$ may be determined based on the first parameter, the second parameter, and the length of the orthogonal sequence for the i-th information bit, and $M_i$ may be the length of the orthogonal sequence of the i-th information bit.

$\alpha_i$ may be generated based on $$\alpha_i = \frac{2\pi\{(p_{o,i} + p_{d,i}) \bmod M_i\}}{M_i},$$

$p_{o,i}$ may be the first parameter, and $p_{d,i}$ may be the second parameter.

At least one of the first parameter, the second parameter, and information indicating the length of the orthogonal sequence may be set by the second communication node.

When the orthogonal sequences are transmitted to the second communication node using the radio resources, the instructions may further cause the first communication node to: map a first orthogonal sequence of a first information bit among the plurality of information bits from a lowest frequency resource; sequentially map remaining orthogonal sequences excluding the first orthogonal sequence among the orthogonal sequences to remaining frequency resources; and transmit the mapped orthogonal sequences.

According to the exemplary embodiments of the present disclosure, a signal (e.g., information or data) may be transmitted using an orthogonal sequence. Here, the length of the orthogonal sequence may be smaller than the length corresponding to the number of allocated frequency resources (e.g., subcarriers or resource elements (REs)). In this case, a decrease in reception performance due to a frequency selective fading and/or a time synchronization error may be prevented, and a signal-to-noise ratio (SNR) may be improved. Accordingly, the probability of occurrence of an error in the signal detection procedure (e.g., data detection procedure) may be reduced, and the performance of the communication system may be improved.

BRIEF DESCRIPTION OF DRAWINGS

Exemplary embodiments of the present disclosure will become more apparent by describing in detail embodiments of the present disclosure with reference to the accompanying drawings, in which.

Figure 1:
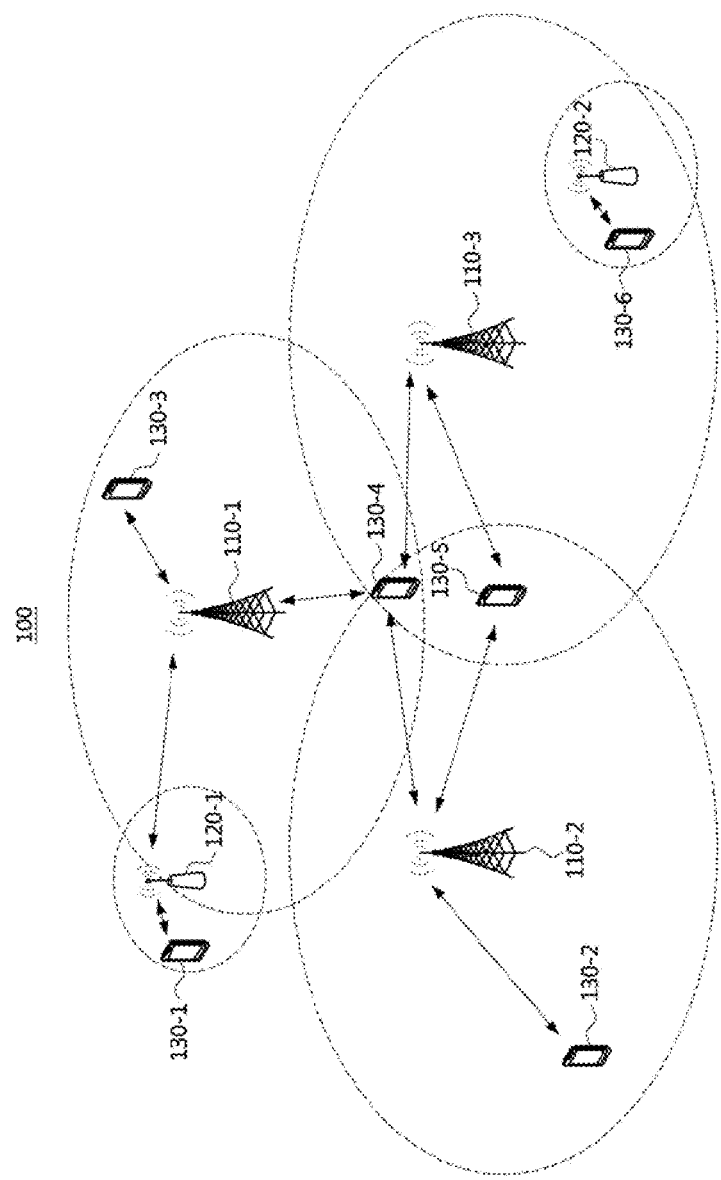
FIG. 1 is a conceptual diagram illustrating a first exemplary embodiment of a communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein.

Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be a 4G communication network (e.g., a long-term evolution (LTE) communication system or an LTE-advanced (LTE-A) communication system), a 5G communication network (e.g., a new radio (NR) communication system), or the like. The 4G communication system may support communication in a frequency band of 6 GHz or below. The 5G communication system may support communication in a frequency band of 6 GHz or above, as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network. The 'LTE' may refer to the 4G communication system, LTE communication system, or LTE-A communication system, and the 'NR' may refer to the 5G communication system or NR communication system.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. In addition, the communication system 100 may further include a core network (e.g., serving-gateway (S-GW), packet data network (PDN)-gateway (P-GW), and mobility management entity (MME)). When the communication system 100 is the 5G communication system (e.g., NR system), the core network may include an access and mobility management function (AMF), a user plane function (UPF), a session management function (SMF), and the like.

The plurality of communication nodes 110 to 130 may support the communication protocols (e.g., LTE communication protocol, LTE-A communication protocol, NR communication protocol, etc.) defined by technical specifications of 3rd generation partnership project (3GPP). The plurality of communication nodes 110 to 130 may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may have the following structure.

Figure 2:
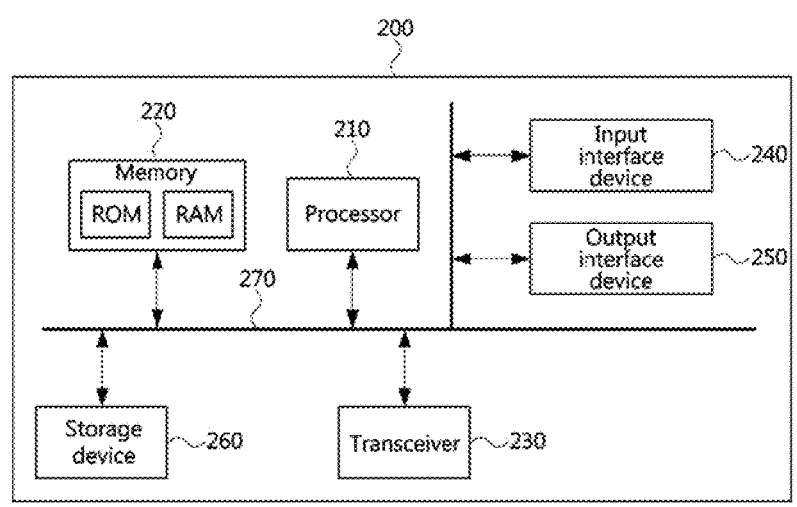
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may forma small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a NodeB (NB), an evolved NodeB (eNB), a gNB, an advanced base station (BTS), a high reliability-base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability-relay station (HR-RS), a home NodeB (HNB), a home eNodeB (HeNB), a roadside unit (RSU), a radio remote head (RRH), a transmission point (TP), a transmission and reception point (TRP), a macro cell, a pico cell, a micro cell, a femto cell, or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for transmitting and receiving a signal using orthogonal sequences in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

In the following exemplary embodiments, the number of information bits to be transmitted may be m, and the number of frequency resources (e.g., subcarriers or resource elements (RES) in the frequency domain) allocated for transmission of the information bits may be $N_a$. A value of each of the information bits may be 0 or 1. An orthogonal sequence for transmission of the i-th information bit (i.e., i=0, 1, ... m−1) among the m information bits may be generated based on Equation 1 below.

$$s_i(n_i) = e^{j\alpha_i n_i}, n_i = 0, 1, \ldots, M_i - 1,  \quad \text{[Equation 1]}$$

$M_i$ may be the length of the orthogonal sequence for transmission of the i-th information bit. The m information bits may be transmitted using orthogonal sequences having the same length. Alternatively, the m information bits may be transmitted using orthogonal sequences having different lengths. The relationship between $M_i$ and $N_a$ may be defined as in Equation 2 below.

$$\sum_{i=0}^{m-1} M_i = N_a \quad \text{[Equation 2]}$$

In Equation 1, $\alpha_i$ may be defined as in Equation 3 below.

$$\alpha_i = \frac{2\pi\{(p_{o,i} + p_{d,i}) \bmod M_i\}}{M_i} \quad \text{[Equation 3]}$$

$p_{o,i}$ (i=0, 1, ... $M_i$−1) may be a phase determination parameter for multiplexing (hereinafter referred to as a 'multiplexing parameter'). $p_{d,i}$ (i=0, 1, ... $M_i$−1) may be a parameter representing phase information for determining the i-th information bit (hereinafter referred to as a 'phase parameter'). For example, when the value of the i-th information bit is 0, $p_{d,i}$ may be 0. When the value of the i-th information bit is 1, $p_{d,i}$ may be $M_i/2$. As an example of a multiplexing scheme, '$p_{o,i}$=0' may be allocated to a first communication node (e.g., first terminal), and '$p_{o,j}$=1' may be allocated to a second communication (e.g., second terminal). In this case, information bits of a plurality of communication nodes (e.g., the first communication node and the second communication node) may be multiplexed on the same resources.

The orthogonal sequences generated based on Equation 1 may be mapped to radio resources (e.g., frequency resources allocated for transmission of the information bits). That is, the orthogonal sequences may be transmitted on the allocated frequency resources. The orthogonal sequences may be mapped to frequency resources based on the following scheme.

Figure 3:
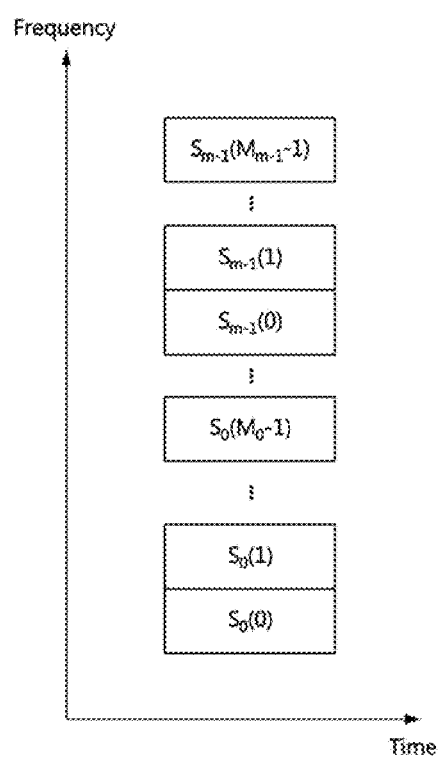
FIG. 3 is a conceptual diagram illustrating a first exemplary embodiment of a mapping method between orthogonal sequences and frequency resources in a communication system.

FIG. 3 is a conceptual diagram illustrating a first exemplary embodiment of a mapping method between orthogonal sequences and frequency resources in a communication system.

Referring to FIG. 3, orthogonal sequences (e.g., $s_0(0, 1, \ldots, M_i-1)$, $s_1(0, 1, \ldots, M_i-1), \ldots, s_{m-1}(0, 1, \ldots, M_i-1)$) may be mapped to frequency resources. The orthogonal sequence $s_0(0, 1, \ldots, M_i-1)$ of the first information bit may be mapped from a subcarrier or RE having the lowest index (e.g., the lowest frequency) among the allocated frequency resources. The orthogonal sequences of the remaining information bits may be sequentially mapped to the frequency resources. The orthogonal sequence $s_{m-1}(0, 1, \ldots, M_i-1)$ of the last information bit may be mapped to a subcarrier or RE having the highest index (e.g., the highest frequency) among the allocated frequency resources.

Alternatively, the orthogonal sequence $s_0(0, 1, \ldots, M_{i-1})$ of the first information bit may be mapped from the subcarrier or RE having the highest index (e.g., the highest frequency) among the allocated frequency resources. The orthogonal sequences of the remaining information bits may be sequentially mapped to the frequency resources. The orthogonal sequence $s_{m-1}(0, 1, \ldots, M_i-1)$ of the last information bit may be mapped to the subcarrier or RE having the lowest index (e.g., the lowest frequency) among the allocated frequency resources.

Figure 4:
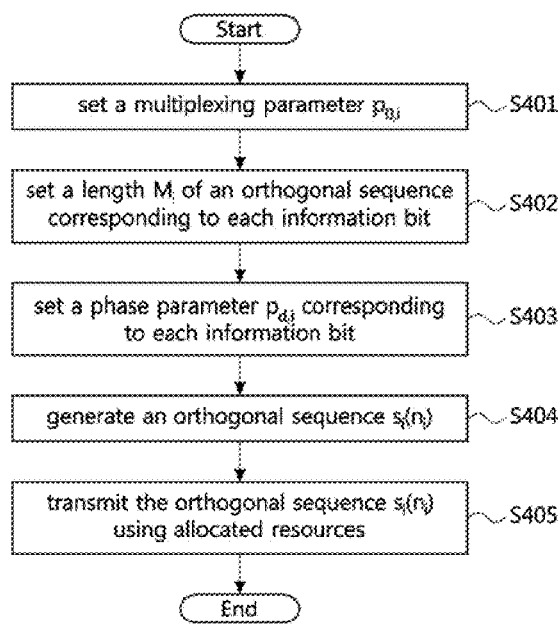
FIG. 4 is a flowchart illustrating a first exemplary embodiment of a method for transmitting a signal using an orthogonal sequence in a communication system.

FIG. 4 is a flowchart illustrating a first exemplary embodiment of a method for transmitting a signal using an orthogonal sequence in a communication system.

Referring to FIG. 4, a first communication node may be the base station or the terminal (e.g., UE) shown in FIG. 1, and may be configured to be the same as or similar to the communication node 200 shown in FIG. 2. The first communication node may transmit a signal (e.g., information or data) using the orthogonal sequences defined in Equation 1. The first communication node may set a multiplexing parameter $p_{0,i}$ (S401). The first communication node may set a length $M_i$ of an orthogonal sequence corresponding to each information bit (S402). In the step S402, the first communication node may determine the length $M_i$ of the orthogonal sequence that satisfies Equation 2. The first communication node may set a phase parameter $p_{d,i}$ corresponding to the value of each information bit (S403).

The first communication node may generate $\alpha_i$ by applying the multiplexing parameter $p_{0,i}$, the length $M_i$ of the orthogonal sequence, and the phase parameter $p_{d,i}$ to Equation 3. The first communication node may generate an orthogonal sequence $s_i(n_i)$ by applying $\alpha_i$ to Equation 1 (S404). The first communication node may transmit the orthogonal sequence $s_i(n_i)$ to the second communication node on allocated frequency resources (e.g., $N_a$ frequency resources) (S405). Here, the orthogonal sequence $s_i(n_i)$ may be mapped to the frequency resources based on the scheme shown in FIG. 3, and the mapped orthogonal sequence $s_i(n_i)$ may be transmitted.

The above-described parameter(s) (e.g., $p_{0,i}$, $p_{d,i}$, $M_i$, and/or $N_a$) may be predefined in the specifications. In this case, the step S401, the step S402, and/or the step S403 may be omitted. Alternatively, the above-described parameter(s) (e.g., $p_{0,i}$, $p_{d,i}$, $M_i$, and/or $N_a$) may be set by the first communication node. Alternatively, the above-described parameter(s) (e.g., $p_{0,i}$, $p_{d,i}$, $M_i$, and/or $N_a$) may be preset by signaling. The signaling may be a combination of one or two or more of higher layer signaling, medium access control (MAC) signaling, and physical (PHY) signaling. The higher layer signaling may be a procedure for transmitting and receiving system information (e.g., master information block (MIB) or system information block (SIB)) and/or a radio resource control (RRC) message. The MAC signaling may be a procedure for transmitting and receiving a MAC control element (CE). The PHY signaling may be a procedure for transmitting and receiving control information (e.g., downlink control information (DCI), uplink control information (UCI), sidelink control information (SCI)).

When the first communication node is a base station and the second communication node is a terminal, the first communication node may inform the second communication node of the above-described parameter(s) (e.g., $p_{0,i}$, $p_{d,i}$, $M_i$, and/or $N_a$) through the signaling before the step S405. When the first communication node is a terminal and the second communication node is a base station, the first communication node may obtain the above-described parameter(s) (e.g., $p_{0,i}$, $p_{d,i}$, $M_i$, and/or $N_a$) from the second communication node through the signaling, and perform the steps S401 to S405 using the parameter(s) set by the second communication node. When the first communication node and the second communication node are different terminals, the first communication node may obtain the above-described parameter(s) (e.g., $p_{0,i}$, $p_{d,i}$, $M_i$, and/or $N_a$) from a base station or the second communication node through the signaling, and perform the steps S401 to S405 using the parameter(s) set by the base station or the second communication node.

Hereinafter, methods of detecting a signal (e.g., information or data) transmitted using orthogonal sequences will be described. A reception sequence for the signal transmitted using the orthogonal sequence may be defined as $r(n)$, $n=0, 1, \ldots N_a$. The maximum value of $C_{i,b}$ for the value of the i-th information bit (e.g., $b \in \{0,1\}$) may be determined based on Equation 4 below.

$$\max C_{i,b} = X_1 + X_2 \qquad \text{[Equation 4]}$$

$X_1$ in Equation 4 may be defined as in Equation 5 below, and $X_2$ in Equation 4 may be defined as in Equation 6 below.

$$X_1 = |\Sigma_{i=0}^{m-1} \Sigma_{n=0}^{M_i-1} r(n') s^*_{i,b}(n)|^2 \text{ 또는 } X_1 = |\Sigma_{i=0}^{m-1} \Sigma_{n=0}^{M_i-1} r(n') s^*_{i,b}(n)| \qquad \text{[Equation 5]}$$

$$X_2 = \Sigma_{i=0}^{m-1} |\Sigma_{n=0}^{M_i-1} r(n') s^*_{i,b}(n)|^2 \text{ 또는 } X_2 = \Sigma_{i=0}^{m-1} |\Sigma_{n=0}^{M_i-1} r(n') s^*_{i,b}(n)| \qquad \text{[Equation 6]}$$

Here, $s_{i,b}(n)$ may be an orthogonal sequence corresponding to the value of the i-th information bit (e.g., $b \in \{0,1\}$). $x^*$ may be a complex conjugate of x. n' may be defined as in Equation 7 below.

$$n' = \sum_{i=0}^{i-1} M_i + n \qquad \text{[Equation 7]}$$

The value of the i-th information bit may be determined by using the maximum value of $C_{i,b}$ calculated by Equation 4. In Equation 4, $X_2$ may be a coherent sum for a narrower frequency band as compared with $X_1$. Accordingly, a delay due to a frequency selective fading and/or a time synchronization error (e.g., group delay) may be reduced, and thus a probability of detecting the signal may be improved. In Equation 4, $X_1$ may be a coherent sum for a wider frequency band as compared with $X_2$. Accordingly, a signal-to-noise ratio (SNR) may be improved. That is, when signals are transmitted and received using orthogonal sequences, they may be robust against the frequency selective fading and/or the time synchronization errors, and the SNR may be improved.

Figure 5:
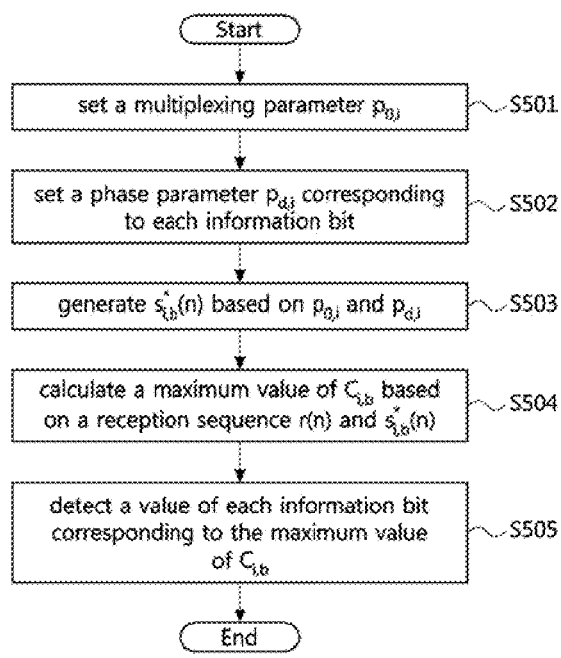
FIG. 5 is a flowchart showing a first exemplary embodiment of a method for receiving a signal in a communication system.

FIG. 5 is a flowchart showing a first exemplary embodiment of a method for receiving a signal in a communication system.

Referring to FIG. 5, a first communication node (e.g., base station or terminal) may transmit a signal (e.g., information or data) using orthogonal sequences defined in Equation 1. That is, the first communication node may transmit the signal by performing the steps shown in FIG. 4. A second communication node may perform a monitoring operation to obtain orthogonal sequences generated based on a plurality of information bits from the first communication node. The second communication node may obtain a reception sequence for the orthogonal sequence through the monitoring operation. The second communication node may perform the following operations to obtain information bit(s) from the reception sequences. Here, the second communication node may be the base station or the terminal (e.g., UE) shown in FIG. 1, and may be configured to be the same as or similar to the communication node 200 shown in FIG. 2.

The second communication node may set a multiplexing parameter $p_{o,i}$ (S501). The second communication node may set a phase parameter $p_{d,i}$ corresponding to the value (e.g., $b \in \{0,1\}$) of the i-th information bit (S502). The second communication node may generate at by applying the multiplexing parameter $p_{o,i}$, the length $M_i$ of the orthogonal sequence, and the phase parameter $p_{d,i}$ to Equation 3. The second communication node may generate an orthogonal sequence $s_i(n_i)$ by applying $\alpha_i$ to Equation 1, and may generate $s^*_{i,b}(n)$ based on $s_i(n_i)$ (S503). $s^*_{i,b}(n)$ may be a complex conjugate number for $s_i(n_i)$.

The above-described parameter(s) (e.g., $p_{o,i}$, $p_{d,i}$, $M_i$, and/or $N_a$) may be predefined in the specifications. In this case, the steps S501 and S502 may be omitted. Alternatively, the above-described parameter(s) (e.g., $p_{o,i}$, $p_{d,i}$, $M_i$, and/or $N_a$) may be set by the second communication node. Alternatively, the above-described parameter(s) (e.g., $p_{o,i}$, $p_{d,i}$, $M_i$, and/or $N_a$) may be preset by signaling. The signaling may be a combination of one or two or more of higher layer signaling, MAC signaling, and PHY signaling. For example, the second communication node may obtain the above-described parameter(s) (e.g., $p_{o,i}$, $p_{d,i}$, $M_i$, and/or $N_a$) from the first communication node or a third communication node through the signaling.

The second communication node may calculate $X_1$ and $X_2$ based on a reception sequence $r(n)$ and $s^*_{i,b}(n)$, and calculate the maximum value of $C_{i,b}$ by applying $X_1$ and $X_2$ to Equation 4 (S504). The second communication node may detect a value of each information bit corresponding to the maximum value of $C_{i,b}$ (S505).

The above-described methods may be different methods of transmitting and detecting different m information bits. In another exemplary embodiment, when one information bit is repeatedly transmitted based on the above-described method (e.g., the methods shown in FIGS. 4 and 5), detection performance of a reception signal may be improved. The first communication node may generate m information bits by repeating one information bit m times. When the value of the information bit is 0 and m is 2, '00' may be generated. The first communication node may transmit orthogonal sequences for '00' based on the method shown in FIG. 4. The second communication node may perform a detection operation on the orthogonal sequences for '00' based on the method shown in FIG. 5.

When the value of the information bit is 1 and m is 2, '11' may be generated. The first communication node may transmit orthogonal sequences for '11' based on the method shown in FIG. 4. The second communication node may perform a detection operation on the orthogonal sequences for '11' based on the method shown in FIG. 5. Even when the orthogonal sequences of the repeated information bits are transmitted, they may be robust to a frequency selective fading and/or a time synchronization errors, and an SNR may be improved.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first communication node in a communication system, the operation method comprising:
  setting a first parameter for multiplexing first data to be transmitted to a first receiving node and second data to transmitted to a second receiving node, wherein the first data is composed first information bits, and the second data is composed of second information bits;
  setting lengths of orthogonal sequences including first length of first orthogonal sequences corresponding to the first information bits, and second length of second orthogonal sequences corresponding to the second information bits;
  setting a second parameter including a first phase information for the first information bits, and a second phase information for the second information bits;
  generating orthogonal sequences based on the first parameter, the second parameter, and the lengths of the orthogonal sequences, wherein the orthogonal sequences comprise the first orthogonal sequences corresponding to the first information bits and the second orthogonal sequences corresponding to the second information bits;

mapping each of the first orthogonal sequences and the second orthogonal sequences to same radio resources; and transmitting, to the first receiving node and the second receiving node, the first orthogonal sequences and the second orthogonal sequences using the same radio resources.

2. The operation method according to claim 1, wherein each of the orthogonal sequences is generated based on $s_i(n_i)=e^{j\alpha_i n_i}$, $n_i=0, 1, \ldots, M_i-1$, $s_i(n_i)$ is an orthogonal sequence of an i-th information bit among the plurality of information bits, $\alpha_i$ is determined based on the first parameter, the second parameter, and the length of the orthogonal sequence for the i-th information bit, and $M_i$ is the length of the orthogonal sequence of the i-th information bit.

3. The operation method according to claim 2, wherein when a value of the i-th information bit is 0, a value of the second parameter is 0, and when the value of the i-th information bit is 1, the value of the second parameter is $M_i/2$.

4. The operation method according to claim 2, wherein $\alpha_i$ is generated based on $$\alpha_i = \frac{2\pi\{(p_{o,i} + p_{d,i})\bmod M_i\}}{M_i},$$

$p_{o,i}$ is the first parameter, and $p_{d,i}$ is the second parameter.

5. The operation method according to claim 1, wherein a sum of the lengths of the orthogonal sequences is a length corresponding to a number of frequency resources constituting the radio resources.

6. The operation method according to claim 1, wherein the lengths of the orthogonal sequences are set equally.

7. The operation method according to claim 1, wherein at least one of the first parameter, the second parameter, and information indicating the length of the orthogonal sequence is signaled to the second communication node.

8. The operation method according to claim 1, wherein the plurality of information bits are m information bits in which one information bit is repeated m times.

9. A first communication node comprising:
a processor;
a memory electronically communicating with the processor; and
instructions stored in the memory, wherein when executed by the processor, the instructions cause the first communication node to:

set a first parameter for multiplexing first data to be transmitted to a first receiving node and second data to be transmitted to a second receiving node, wherein the first data is composed first information bits, and the second data is composed of second information bits;

set lengths of orthogonal sequences including first length of first orthogonal sequences corresponding to the first information bits, and second length of second orthogonal sequences corresponding to the second information bits;

set a second parameter including a first phase information for the first information bits, and a second phase information for the second information bits;

generate orthogonal sequences based on the first parameter, the second parameter, and the lengths of the orthogonal sequences, wherein the orthogonal sequences comprise the first orthogonal sequences corresponding to the first information bits and the second orthogonal sequences corresponding to the second information bits;

map each of the first orthogonal sequences and the second orthogonal sequences to same radio resources; and transmit, to the first receiving node and the second receiving node, the first orthogonal sequences and the second orthogonal sequences using the same radio resources.

10. The first communication node according to claim 9, wherein each of the orthogonal sequences is generated based on $s_i(n_i)=e^{j\alpha_i n_i}$, $n_i=0, 1, \ldots, M_i-1$, $s_i(n_i)$ is an orthogonal sequence of an i-th information bit among the plurality of information bits, $\alpha_i$ is determined based on the first parameter, the second parameter, and the length of the orthogonal sequence for the i-th information bit, and $M_i$ is the length of the orthogonal sequence of the i-th information bit.

11. The first communication node according to claim 10, wherein $\alpha_i$ is generated based on $$\alpha_i = \frac{2\pi\{(p_{o,i} + p_{d,i})\bmod M_i\}}{M_i},$$

$p_{o,i}$ is the first parameter, and $p_{d,i}$ is the second parameter.

12. The first communication node according to claim 9, wherein at least one of the first parameter, the second parameter, and information indicating the lengths of the orthogonal sequences is set by first receiving node and the second receiving node.

* * * * *